(12) United States Patent
Wang (10) Patent No.: US 12,525,881 B2
(45) Date of Patent: Jan. 13, 2026

(54) NON-AUDIBLE SWITCHING CONVERTER AND CONTROL METHOD THEREOF

(71) Applicant: Chengdu Monolithic Power Systems Co., Ltd., Chengdu (CN)

(72) Inventor: Kangle Wang, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 218 days.

(21) Appl. No.: 18/449,875

(22) Filed: Aug. 15, 2023

(65) Prior Publication Data
US 2023/0402917 A1    Dec. 14, 2023

(30) Foreign Application Priority Data
Aug. 24, 2022   (CN) .......................... 202211022094.3

(51) Int. Cl.
*H02M 3/156*   (2006.01)
*H02M 1/00*    (2006.01)

(52) U.S. Cl.
CPC ......... *H02M 3/156* (2013.01); *H02M 1/0032* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088;
(Continued)

(56) References Cited

U.S. PATENT DOCUMENTS

8,680,826 B2 *   3/2014   Kondo ............... H02M 3/1584
                                                     323/283
9,041,373 B2     5/2015   Jiang et al.
(Continued)

*Primary Examiner* — Jeffrey A Gblende
(74) *Attorney, Agent, or Firm* — Perkins Coie LLP (57) ABSTRACT

A control circuit used in a switching converter. The switching converter has a switching circuit and provides an output voltage at an output terminal. The control circuit includes a switch control circuit and a dummy load control circuit. The switch control circuit receives a feedback voltage signal indicative of the output voltage and generates a switch control signal to control a switch of the switching circuit based on the feedback voltage signal. The dummy load control circuit is coupled to the switch control circuit and generates a dummy load control signal to regulate the power consumed by a dummy load coupled between the output terminal and a reference ground based on the operation of the switch control circuit.

15 Claims, 4 Drawing Sheets

(58) Field of Classification Search
CPC ... H02M 1/0048; H05B 39/048; B23K 11/24; H04B 2215/069
See application file for complete search history.

(56) References Cited

U.S. PATENT DOCUMENTS

| | | |
|---|---|---|
| 9,520,778 B2 | 12/2016 | Jiang et al. |
| 10,050,615 B2 * | 8/2018 | Chen .................. H03K 17/0822 |
| 10,164,514 B2 | 12/2018 | Li |
| 2014/0175885 A1 * | 6/2014 | Shih ........................ H02J 9/005 |
| | | 307/31 |
| 2017/0187282 A1 | 6/2017 | Wang et al. |
| 2018/0183317 A1 * | 6/2018 | Nakahara .......... H02M 7/53871 |
| 2021/0368603 A1 * | 11/2021 | Takahashi .......... H05B 45/3575 |

* cited by examiner

NON-AUDIBLE SWITCHING CONVERTER AND CONTROL METHOD THEREOF

CROSS-REFERENCE TO RELATED APPLICATIONS

This application claims the benefit of CN application 202211022094.3, filed on Aug. 24, 2022, and incorporated herein by reference.

TECHNICAL FIELD OF THE INVENTION

The present invention generally relates to electronic circuits, and more particularly but not exclusively, to switching converters and associated control methods.

BACKGROUND OF THE INVENTION

Switching converters are widely used in power supply area. Generally, as a load becomes lighter, a switching frequency of a switching converter will gradually decrease to reduce power loss. However, under light load or no load condition, the switching frequency may decrease into an audible range, so audible noise is generated.

SUMMARY OF THE INVENTION

An embodiment of the present invention discloses a control circuit used in a switching converter. The switching converter has a switching circuit and provides an output voltage at an output terminal. The control circuit includes a switch control circuit and a dummy load control circuit. The switch control circuit is configured to receive a feedback voltage signal indicative of the output voltage and to generate a switch control signal to control a switch of the switching circuit based on the feedback voltage signal. The dummy load control circuit is coupled to the switch control circuit and is configured to generate a dummy load control signal to regulate the power consumed by a dummy load coupled between the output terminal and a reference ground based on the operation of the switch control circuit.

An embodiment of the present invention discloses a switching converter. The switching converter has a switching circuit and provides an output voltage at an output terminal. The switching converter further includes a switch control circuit and a dummy load control circuit. The switch control circuit is configured to receive a feedback voltage signal indicative of the output voltage and to generate a switch control signal to control a switch of the switching circuit based on the feedback voltage signal. The dummy load control circuit is coupled to the switch control circuit and is configured to generate a dummy load control signal to regulate the power consumed by a dummy load coupled between the output terminal and a reference ground based on the operation of the switch control circuit.

An embodiment of the present invention discloses a control method used in a switching converter. The switching converter has a switching circuit and provides an output voltage at an output terminal. The control method includes the following steps. 1) Coupling a dummy load between the output terminal and a reference ground. 2) Generating a switch control signal to control a switch of the switching circuit based on the feedback voltage signal. 3) Generating a dummy load control signal to regulate the power consumed by a dummy load coupled between the output terminal and a reference ground based on the switch control signal.

BRIEF DESCRIPTION OF DRAWINGS

The present invention can be further understood with reference to the following detailed description and the appended drawings, where like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. In addition, when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
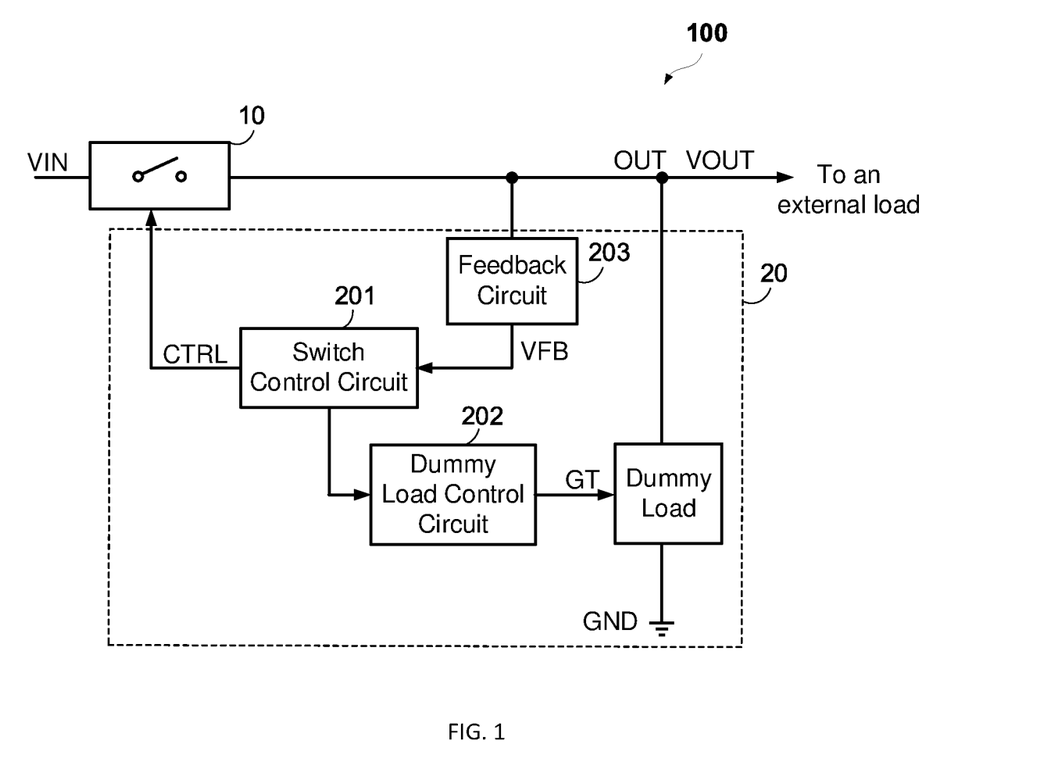
FIG. 1 illustrates a block diagram of a switching converter 100 in accordance with an embodiment of the present invention.

FIG. 1 illustrates a block diagram of a switching converter 100 in accordance with an embodiment of the present invention. As shown in FIG. 1, the switching converter 100 includes a switching circuit 10 and a control circuit 20. The switching circuit 10 includes a switch and is configured to provide an output voltage VOUT at an output terminal OUT to supply power to an external load (not shown). Those skilled in the art can understand that the switching circuit 10 can be configured as any suitable DC/DC or AC/DC topology, such as a synchronous or asynchronous buck, boost, forward or flyback converter and so on. The switch of the switching circuit 10 can be any controllable semiconductor device, such as BJT, MOSFET, IGBT, and so on.

The control circuit 20 includes a switch control circuit 201, a dummy load control circuit 202 and a dummy load DR, where the dummy load DR is coupled between the output terminal OUT and a reference ground GND. In one embodiment, the control circuit 20 may be integrated in a single integrated circuit (IC). Those skilled in the art can understand that the external load refers to a real load of the switching converter 100, and the external load is not a part of the switching converter 100. While the dummy load DR is a part of the control circuit 20, and is also a part of the switching converter 100. The power consumed by the dummy load DR can be regulated to satisfy the requirements of the switching converter 100 and/or the external load. In one embodiment, the power consumed by the dummy load DR can be regulated to prevent a switching frequency f of the switching converter 100 from decreasing into the audible range, thus prevent the switching converter 100 from generating the audible noise.

The switch control circuit 201 receives a feedback voltage signal VFB indicative of the output voltage VOUT, and generates a switch control signal CTRL to control the switch of the switching circuit 10 based on the feedback voltage signal VFB.

The dummy load control circuit 202 is coupled to the switch control circuit 201 and generates a dummy load control signal GT to regulate the power consumed by the dummy load DR based on the operation of the switch control circuit 201. In one embodiment, the dummy load DR is a controllable semiconductor device, and the dummy load control circuit 202 is coupled to a control terminal of the controllable semiconductor device to provide the dummy load control signal GT. In one embodiment, the dummy load control circuit 202 provides a control current signal to regulate the dummy load control signal GT, thereby regulating the power consumed by the dummy load DR. In another embodiment, the dummy load DR is a variable resistor, and the dummy load control signal GT decreases/increases the power consumed by the variable resistor by increasing/decreasing the resistance of the variable resistor.

In one embodiment, the control circuit 20 further includes a feedback circuit 203. The feedback circuit 203 receives the output voltage VOUT, and generates the feedback voltage signal VFB based on the output voltage VOUT.

Figure 2:
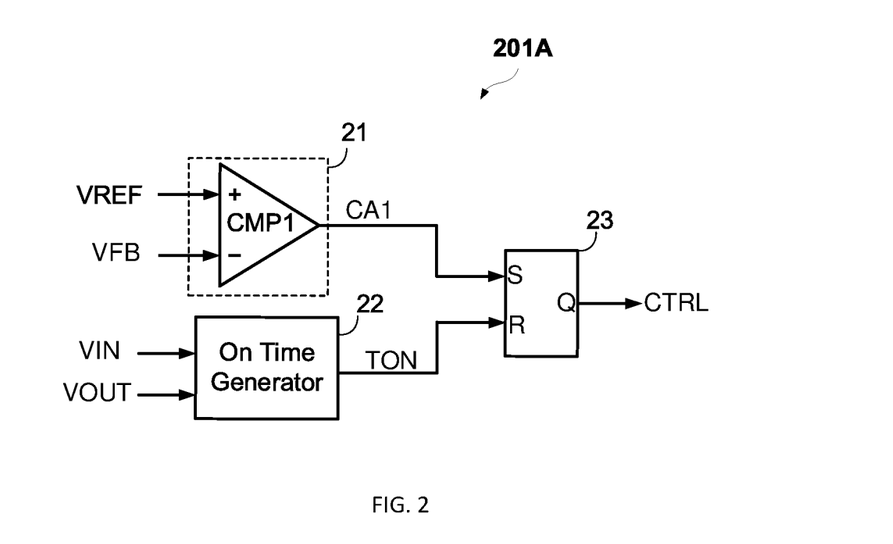
FIG. 2 illustrates a schematic diagram of a switch control circuit 201A used in the switching converter 100 in accordance with an embodiment of the present invention.

FIG. 2 illustrates a schematic diagram of a switch control circuit 201A used in the switching converter 100 in accordance with an embodiment of the present invention. In the example shown in FIG. 2, the switch control circuit 201A includes a first comparing unit 21, an on time generator 22 and a first RS flip-flop 23. The first comparing unit 21 receives the feedback voltage signal VFB, and generates a first comparing signal CA1 based on the feedback voltage signal VFB and a reference voltage signal VREF. In one embodiment, the first comparing unit 21 includes a first comparator CMP1 having a non-inverting input terminal, an inverting input terminal and an output terminal. Where the non-inverting input terminal receives the reference voltage signal VREF, and the inverting input terminal receives the feedback voltage signal VFB, the first comparator CMP1 compares the feedback voltage signal VFB with the reference voltage signal VREF and generates the first comparing signal CA1 at the output terminal.

The on time generator 22 receives the input voltage VIN and the output voltage VOUT, and generates an on time signal TON to control an on time of the switch based on the input voltage VIN and the output voltage VOUT. In one embodiment, the on time generator 22 does not receive the input voltage VIN and the output voltage VOUT and generates the on time signal TON based on a fixed signal.

The first RS flip-flop 23 has a set terminal S, a reset terminal R and an output terminal Q, where the set terminal S receives the first comparing signal CA1, and the reset terminal R receives the on time signal TON. Based on the first comparing signal CA1 and the on time signal TON, the first RS flip-flop 23 generates the switch control signal CTRL at the output terminal Q.

In the example shown in FIG. 2, the constant on time control is used as an example to illustrate, but those skilled in the art can understand that, the example is only for illustration, but not for limiting the invention to the embodiment. Other suitable control methods, such as voltage control, current control, off time control and so on, may be also used without departing from the scope of the invention.

Figure 3:
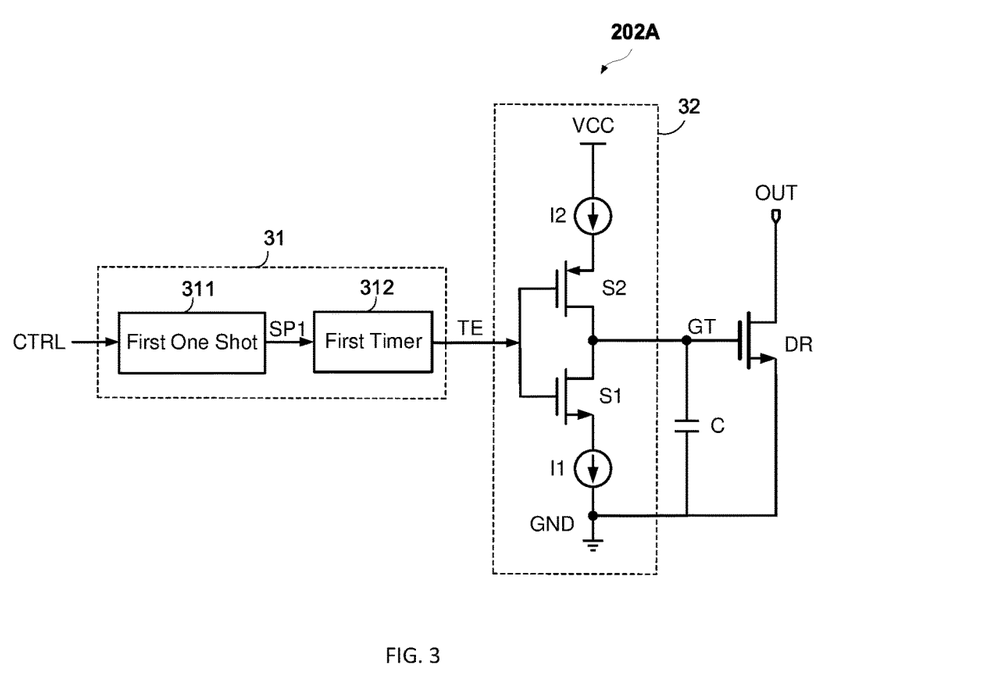
FIG. 3 illustrates a schematic diagram of a dummy load control circuit 202A used in the switching converter 100 in accordance with an embodiment of the present invention.

FIG. 3 illustrates a schematic diagram of a dummy load control circuit 202A used in the switching converter 100 in accordance with an embodiment of the present invention. As shown in FIG. 3, the dummy load control circuit 202A receives the switch control signal CTRL generated by the switch control circuit 201, and generates the dummy load control signal GT to control the dummy load DR based on the switch control signal CTRL. The dummy load control circuit 202A includes a timing unit 31, a charging and discharging control unit 32 and a capacitor C. The timing unit 31 receives the switch control signal CTRL and generates a timing signal TE based on the switch control signal CTRL. When a timing length of the timing unit 31 is shorter than a first time threshold Tth1, the timing signal TE is in a first state. When the timing length is longer than the first time threshold Tth1, the timing signal TE is changed to a second state. The capacitor C is coupled between the control terminal of the dummy load DR and the reference ground GND. The charging and discharging control unit 32 discharges the capacitor C in response to the first state of the timing signal TE, and charges the capacitor C in response to the second state of the timing signal TE. In one embodiment, the timing unit 31 may start timing at the moment of the switch of the switching circuit 10 being turned on or turned off.

In the example shown in FIG. 3, the timing unit 31 includes a first one shot 311 and a first timer 312. The first one shot 311 receives the switch control signal CTRL, and generates a first short pulse signal SP1 based on the switch control signal CTRL. The first timer 312 receives the first short pulse signal SP1, and generates the timing signal TE based on the first short pulse signal SP1. In detail, in response to the switch being turned on, that is, in response to a rising edge of the switch control signal CTRL, the first one shot 311 generates the first short pulse signal SP1. The first timer 312 starts timing under the trigger of the first short pulse signal SP1. At the time, the timing signal TE is in the first state (e.g., logic high state). If the timing length of the first timer 312 reaches the first time threshold Tth1 before a next rising edge of the switch control signal CTRL arriving, the timing signal TE is changed to the second state (e.g., logic low state). Then in response to the next rising edge of the switch control signal CTRL, the timing length is reset and the first timer 312 starts timing again, and the timing signal TE is changed to the first state. If the next rising edge of the switch control signal CTRL arrives before the timing length of the first timer 312 reaching the first time threshold Tth1, the timing length is reset and the first timer 312 starts timing again, and the timing signal TE is kept in the first state. That is to say, if a switching cycle T of the switching converter 100 is longer than the first time threshold Tth1, the timing signal TE is in the first state during the time period from 0 to Tth1, and is in the second state during the time period from Tth1 to T. If the switching period T is shorter than the first time threshold Tth1, the timing signal TE is kept in the first state. In one embodiment, the first time threshold Tth1 may be set based on a first frequency threshold fth1, where Tth1=½/fth1. For example, when the first frequency threshold fth1 is 45 kHz, then the first time threshold Tth1 is about 11 μs.

The charging and discharging control unit 32 includes a discharging current source I1, a charging current source I2, a discharging control switch S1 and a charging control switch S2. Both the discharging control switch S1 and the charging control switch S2 are controlled by the timing signal TE. In response to the first state of the timing signal TE, the discharging control switch S1 controls the discharging current source I1 to provide the control current signal with negative value to discharge the capacitor C. In response to the second state of the timing signal TE, the charging control switch S2 controls the charging current source I2 to provide the control current signal with positive value to charge the capacitor C. Accordingly, the dummy load control signal GT is generated based on a voltage across the capacitor C. In one embodiment, the control current signals provided by the discharging current source I1 and the charging current source I2 have the same absolute values.

In the example shown in FIG. 3, when the switching frequency f of the switching converter 100 is lower than the first frequency threshold fth1, i.e., T>2*Tth1, the duration of the first state of the timing signal TE is shorter than the duration of the second state of the timing signal TE. Thus, the dummy load control signal GT increases and the power consumed by the dummy load DR is controlled to increase. Then the total load (i.e., the sum of the external load and the dummy load) of the switching converter 100 becomes heavier and the switching frequency f increases through feedback control. When the switching frequency f increases to the first frequency threshold fth1, i.e., T=2*Tth1, the duration of the first state of the timing signal TE is equal to the duration of the second state of the timing signal TE, so the dummy load control signal GT keeps unchanged. The power consumed by the dummy load DR is regulated to be unchanged, the total load also keeps unchanged, and the system reaches a steady state.

When the switching frequency f is greater than a second frequency threshold fth2, where the second frequency threshold fth2 is twice the first frequency threshold fth1, i.e., T<Tth1, the timing signal TE keeps in the first state, and the dummy load control signal GT is Zero, so the power consumed by the dummy load DR is also zero. At the time, the dummy load DR has no influence on the switching converter 100.

When the switching frequency f is between the first frequency threshold fth1 and the second frequency threshold fth2, i.e., Tth1<T<2*Tth1, the duration of the first state of the timing signal TE is longer than the duration of the second state of the timing signal TE. Thus, the dummy load control signal GT is very small, and the power consumed by the dummy load DR is controlled to be very small. For example, the power consumed by the dummy load DR may be lower than a first power threshold. At the time, the power consumed by the dummy load DR is very small, thus the influence on the switching converter 100 is also very small.

Figure 4:
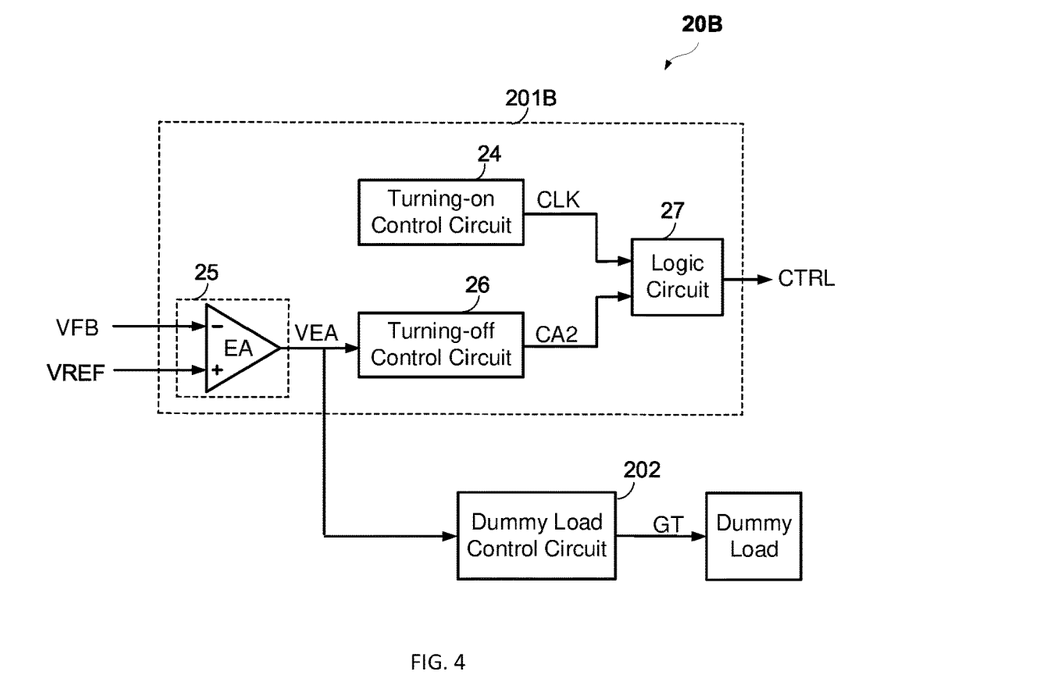
FIG. 4 illustrates a schematic diagram of a control circuit 20B used in the switching converter 100 in accordance with another embodiment of the present invention.

FIG. 4 illustrates a schematic diagram of a control circuit 20B used in the switching converter 100 in accordance with another embodiment of the present invention. As shown in FIG. 4, the control circuit 20B includes a switch control circuit 201B, a dummy load control circuit 202 and a dummy load DR.

The switch control circuit 201B includes a turning-on control circuit 24, an error amplifying circuit 25, a turning-off control circuit 26 and a logic circuit 27. The turning-on control circuit 24 generates a turning-on control signal CLK to turn on the switch of the switching circuit 10. The error amplifying circuit 25 receives the feedback voltage signal VFB, and amplifies the difference between the reference voltage signal VREF and the feedback voltage signal VFB to generate an error amplifying signal VEA. The turning-off control circuit 26 is coupled to the error amplifying circuit 25 to receive the error amplifying signal VEA, and generates a turning-off control signal CA2 to turn off the switch based on the error amplifying signal VEA. The logic circuit 27 generates the switch control signal CTRL based on the turning-on control signal CLK and the turning-off control signal CA2.

The dummy load control circuit 202 is coupled to the error amplifying circuit 25 to receive the error amplifying signal VEA, and generates the dummy load control signal GT to regulate the power consumed by the dummy load DR based on the error amplifying signal VEA. In one embodiment, when the error amplifying signal VEA is lower than a voltage threshold Vth, the power consumed by the dummy load DR increases with the decrease of the error amplifying signal VEA; when the error amplifying signal VEA is higher than the voltage threshold Vth, the power consumed by the dummy load DR is zero.

Figure 5:
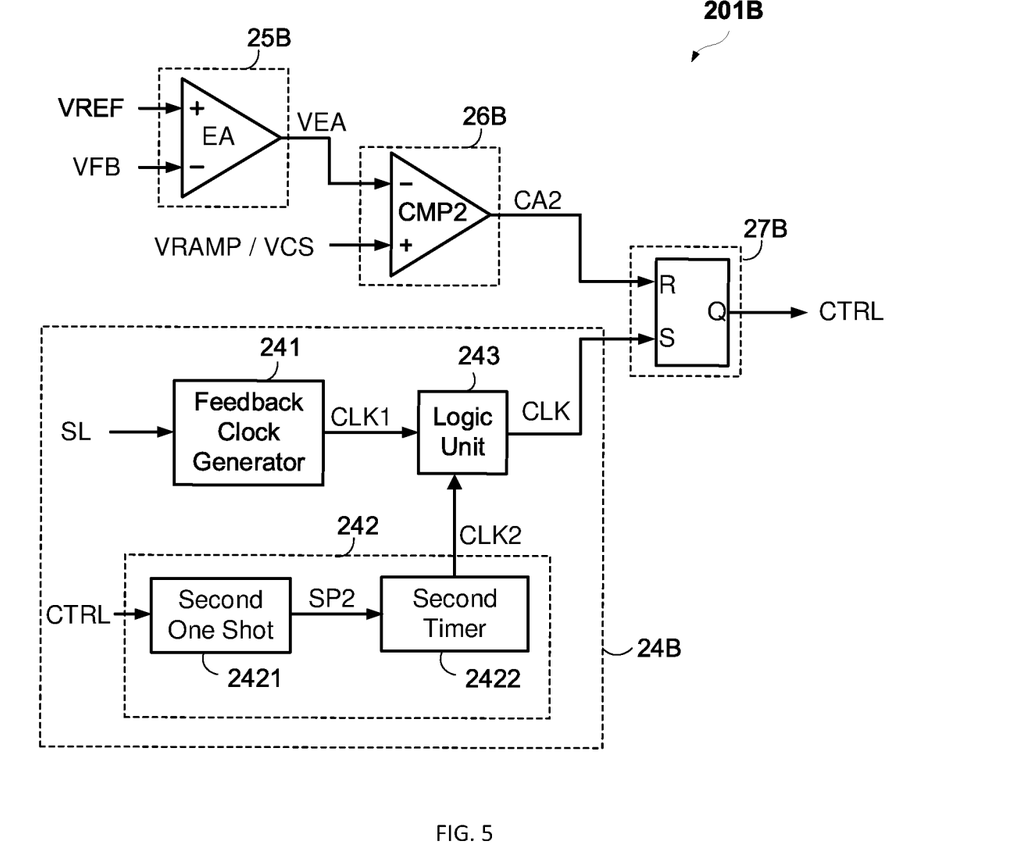
FIG. 5 illustrates a schematic diagram of a switch control circuit 201B used in the control circuit 20B in accordance with an embodiment of the present invention.

FIG. 5 illustrates a schematic diagram of a switch control circuit 201B used in the control circuit 20B in accordance with an embodiment of the present invention. As shown in FIG. 5, the switch control circuit 201B includes a turning-on control circuit 24B, an error amplifying circuit 25B, a turning-off control circuit 26B and a logic circuit 27B. The turning-on control circuit 24 receives the switch control signal CTRL, and generates the turning-on control signal CLK based on the switch control signal CTRL. In the example shown in FIG. 5, the turning-on control circuit 24 also receives a load detecting signal SL indicative of the state of the external load, and generates the turning-on control signal CLK based on the switch control signal CTRL and the load detecting signal SL. Where the load detecting signal SL can be obtained by sensing an output current, an output voltage or an output power of the switching converter 100 and so on, as long as the load detecting signal SL can represent the external load being heavy or light.

The turning-on control circuit 24 includes a feedback clock generator 241, a clock adjusting signal generator 242 and a logic unit 243. The feedback clock generator 241 receives the load detecting signal SL and generates a first clock signal CLK1 based on the load detecting signal SL, where a frequency f1 of the first clock signal CLK1 decreases as the external load becomes lighter and increases as the external load becomes heavier. In another embodiment, the feedback clock generator 241 does not receive the load detecting signal SL, and generates the first clock signal CLK1 with a fixed frequency.

The clock adjusting signal generator 242 receives the switch control signal CTRL, and generates a second clock signal CLK2 based on the switch control signal CTRL, where a frequency f2 of the second clock signal CLK2 is equal to the first frequency threshold fth1. In one embodiment, the clock adjusting signal generator 242 includes a second one shot 2421 and a second timer 2422. The second one shot 2421 receives the switch control signal CTRL, and generates a second short pulse signal SP2 based on the switch control signal CTRL. The second timer 2422 receives the second short pulse signal SP2 and generates the second clock signal CLK2 based on the second short pulse signal SP2. In detail, in response to the power switch being turned on, that is, in response to a rising edge of the switch control signal CTRL, the second one shot 2421 generates the second short pulse signal SP2, and the second timer 2422 starts timing under the trigger of the second short pulse signal SP2. If a timing length of the second timer 2422 reaches a second time threshold Tth2 before a next rising edge of the switch control signal CTRL arriving, the second timer 2422 generates a pulse signal as the second clock signal CLK2 immediately. That is to say, the second timer 2422 generates a pulse signal every the second time threshold Tth2, so the frequency f2 of the second clock signal CLK2 is 1/Tth2. In one embodiment, the second time threshold Tth2 is set based on the first frequency threshold fth1, where Tth2=1/fth1. For example, when the first frequency threshold fth1 is 45 kHz, then the second time threshold Tth2 is about 22 is.

The logic unit 243 receives the first clock signal CLK1 and the second clock signal CLK2, and generates the turning-on control signal CTRL based on the first clock signal CLK1 and the second clock signal CLK2. In one embodiment, when the switching frequency f is higher than the first frequency threshold fth1, the logic unit 243 provides the first clock signal CLK1 as the turning-on control signal CLK. When the switching frequency f is lower than the first frequency threshold fth1, the logic unit 243 provides the second clock signal CLK2 as the turning-on control signal CLK.

The error amplifying circuit 25 receives the feedback voltage signal VFB, and amplifies the difference between the reference voltage signal VREF and the feedback voltage signal VFB to generate the error amplifying signal VEA. In one embodiment, the error amplifying circuit 25 includes an error amplifier EA having a non-inverting input terminal, an inverting input terminal and an output terminal. The non-inverting input terminal receives the reference voltage signal VREF, and the inverting input terminal receives the feedback voltage signal VFB. Based on the reference voltage signal VREF and the feedback voltage signal VFB, the error amplifier EA generates the error amplifying signal VEA at the output terminal.

The turning-off control circuit 26 is coupled to the error amplifying circuit 25 to receive the error amplifying signal VEA, and generates the turning-off control signal CA2 based on the error amplifying signal VEA. In one embodiment, the turning-off control circuit 26 also receives a current sensing signal VCS indicative of a current flowing through an energy storage element of the switching converter 100, and generates the turning-off control signal CA2 based on the error amplifying signal VEA and the current sensing signal VCS. In the example shown in FIG. 5, the turning-off control circuit 26 receives the error amplifying signal VEA and a ramp signal VRAMP, or receives the error amplifying signal VEA and the current sensing signal VCS to generate the turning-off control signal CA2. In one embodiment, the turning-off control circuit 26 includes a second comparator CMP2 having a non-inverting input terminal, an inverting input terminal and an output terminal. The non-inverting input terminal receives the ramp signal VRAMP or the current sensing signal VCS, and the inverting input terminal receives the error amplifying signal VEA. Based on the error amplifying signal VEA and the ramp signal VRAMP or the current sensing signal VCS, the second comparator CMP2 generates the turning-off control signal CA2 at the output terminal.

The logic circuit 27 includes a second RS flip-flop having a set terminal S, a reset terminal R and an output terminal Q. The set terminal S receives the turning-on control signal CLK, and the reset terminal R receives the turning-off control signal CA2. Based on the turning-on control signal CLK and the turning-off control signal CA2, the second RS flip-flop generates the switch control signal CTRL at the output terminal Q.

Figure 6:
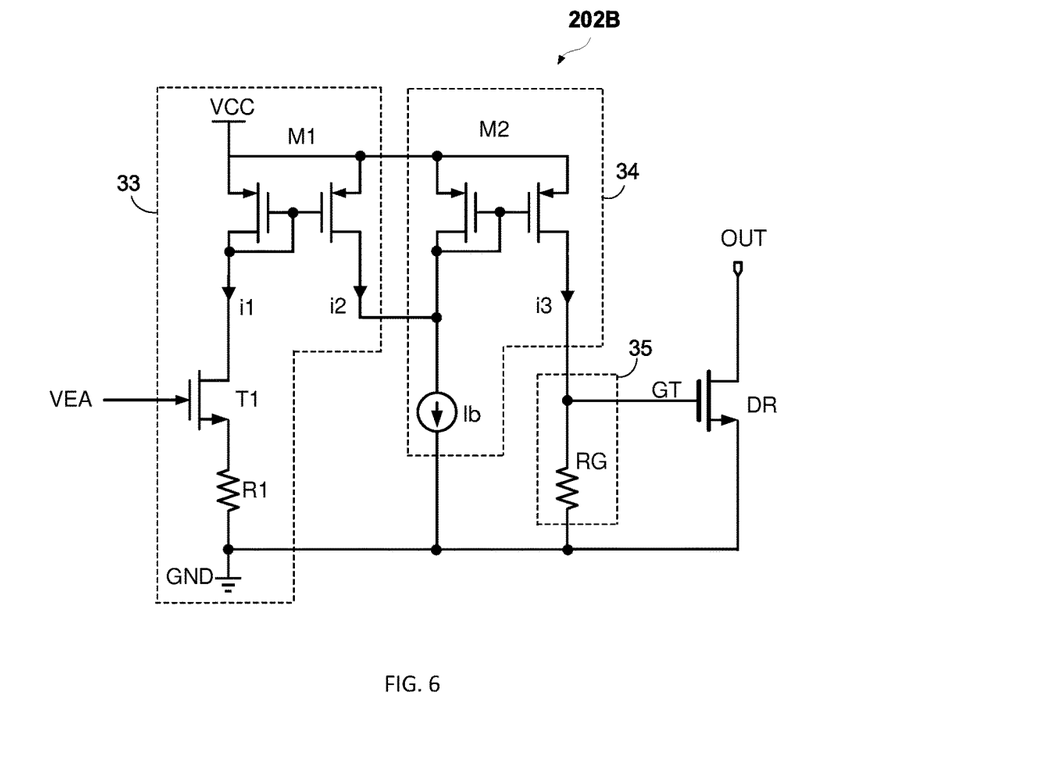
FIG. 6 illustrates a schematic diagram of a dummy load control circuit 202B used in the control circuit 20B in accordance with an embodiment of the present invention.

FIG. 6 illustrates a schematic diagram of a dummy load control circuit 202B used in the control circuit 20B in accordance with an embodiment of the present invention. As shown in FIG. 6, the dummy load control circuit 202B receives the error amplifying signal VEA generated by the error amplifying circuit 25 of the switch control circuit 201B, and generates the dummy load control signal GT to control the dummy load DR based on the error amplifying signal VEA.

The dummy load control circuit 202B includes a voltage current converting unit 33, a current clamping unit 34 and a dummy load control signal generator 35. The voltage current converting unit 33 receives the error amplifying signal VEA, and generates a converting current signal i2 based on the error amplifying signal VEA, where the converting current signal i2 decreases as the error amplifying signal VEA decreases.

The current clamping unit 34 receives the converting current signal i2, and generates a control current signal i3 based on the converting current signal i2. When the converting current signal i2 is higher than a current threshold ith, the control current signal i3 is a zero current signal; when the converting current signal i2 is lower than the current threshold ith, the control current signal i3 increases with the decrease of the converting current signal i2. The dummy load control signal generator receives the control current signal i3, and generates the dummy load control signal GT based on the control current signal i3.

In the example shown in FIG. 6, the voltage current converting unit 33 includes a transistor T and a first current mirror M1. The transistor T has a first terminal, a second terminal and a control terminal, where the control terminal receives the error amplifying signal VEA, the first terminal generates a first current signal i1, and the second terminal is coupled to the reference ground GND. The first current mirror M1 has an input terminal and an output terminal, where the input terminal receives the first current signal i1, and the output terminal generates the converting current signal i2. The current clamping unit 34 includes a current source Ib and a second current mirror M2. The current source Ib provides a fourth current signal ib. The second current mirror M2 has an input terminal and an output terminal, where the input terminal receives the converting current signal i2 and the fourth current signal ib, and the output terminal generates the control current signal i3. The dummy load control signal generator 35 includes a resistor RG. The resistor RG has a first terminal and a second terminal, where the first terminal receives the control current signal i3, and the second terminal is coupled to the reference ground GND. Accordingly, the dummy load control signal GT is generated based on a voltage across the resistor RG.

In the example of FIG. 5 and FIG. 6, when the external load is heavy, the error amplifying signal VEA is high. At the same time, the switching frequency f of the switching converter 100 is also high and does not fall into the audible range. At the time, the error amplifying signal VEA is higher than a voltage threshold Vth, the converting current signal i2 is higher than the fourth current signal ib. Thus, the control current signal i3 is a zero current signal, and the dummy load control signal GT is zero, thereby the power consumed by the dummy load DR is zero.

When the external load decreases, the error amplifying signal VEA also decreases. When the error amplifying signal VEA is lower than the voltage threshold Vth, the converting current signal i2 is lower than the fourth current signal ib. At the time, as the error amplifying signal VEA decreases, the first current signal i1 decreases, and the converting current signal i2 also decreases. The control current signal i3=ib−i2, thus, the control current signal i3 increases with the decrease of the converting current signal i2, and the dummy load control signal GT increases, thereby the power consumed by the dummy load DR being controlled to increase. At the same time, the turning-on control circuit 24 controls the switching frequency f to be higher than or equal to the first frequency threshold fth1.

According to the embodiments of the present invention, the switching converter will not generate the audible noise. The dummy load control signal GT is generated to regulate the power consumed by the dummy load DR based on the operation of the switch control circuit, which is simple and easy. Besides, the dummy load DR does not affect or affects a little on the efficiency of the switching converter.

Figure 7:
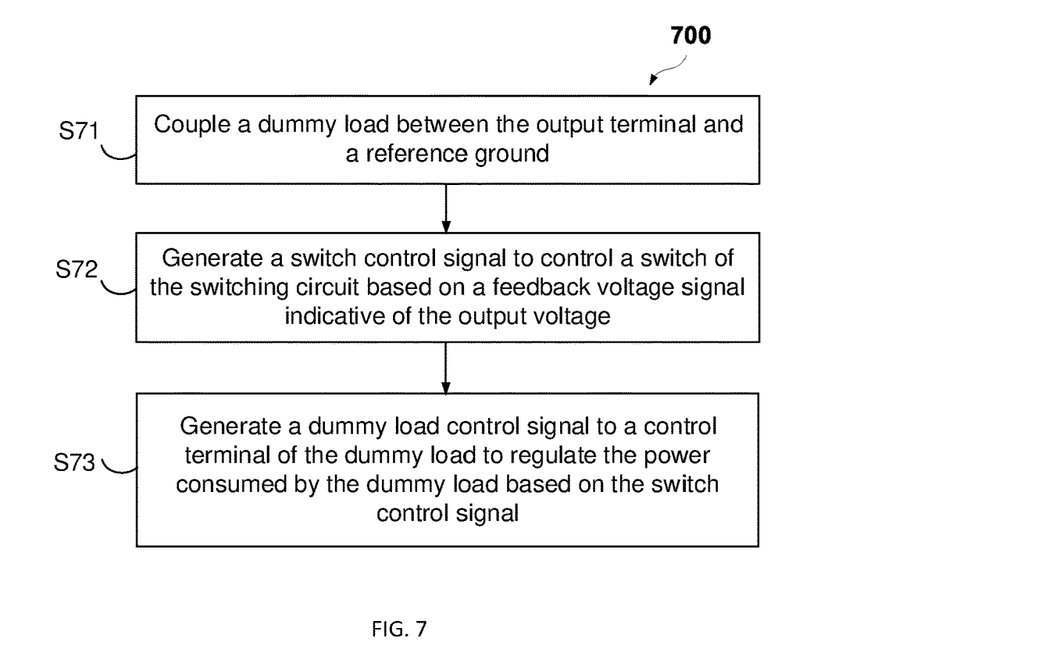
FIG. 7 illustrates a flowchart of a control method 700 used in the switching converter 100 in accordance with an embodiment of the present invention.

FIG. 7 illustrates a flowchart of a control method 700 used in the switching converter 100 in accordance with an embodiment of the present invention. The switching converter 100 includes a switching circuit and provides an output voltage at an output terminal. The control method 700 includes steps S71-S73.

At step S71, a dummy load is coupled between the output terminal and a reference ground.

At step S72, a switch control signal is generated to control a switch of the switching circuit based on a feedback voltage signal indicative of the output voltage.

At step S73, a dummy load control signal is generated to regulate the power consumed by the dummy load based on the switch control signal.

In one embodiment, the step of the dummy load control signal is generated based on the switch control signal includes: a timing signal is generated based on the switch control signal. Where when a timing length is shorter than a first time threshold, the timing signal is in a first state, and when the timing length is longer than the first time threshold, the timing signal is changed to a second state. A capacitor is coupled between a control terminal of the dummy load and the reference ground to provide the dummy load control signal. Where the capacitor is discharged in response to the first state of the timing signal, and is charged in response to the second state of the timing signal.

In one embodiment, the control method 700 further includes: an error amplifying signal is generated by amplifying the difference between a reference voltage signal and the feedback voltage signal; a turning-off control signal is generated based on the error amplifying signal and the switch control signal is generated based on the turning-off control signal and a turning-on control signal. Where the dummy load control signal is generated based on the error amplifying signal. When the error amplifying signal is lower than a first voltage threshold, the power consumed by the dummy load increases with the decrease of the error amplifying signal. When the error amplifying signal is higher than the first voltage threshold, the power consumed by the dummy load is zero.

In a further embodiment, the step of the dummy load control signal is generated based on the error amplifying signal includes: a converting current signal is generated based on the error amplifying signal, where the converting current signal decreases with the decrease of the error amplifying signal. A control current signal is generated based on the converting current signal, where when the converting current signal is higher than a current threshold, the control current signal is a zero current signal, and when the converting current signal is lower than the current threshold, the control current signal increases with the decrease of the converting current signal. And the dummy load control signal is generated based on the control current signal.

In this document, relational terms such as first and second, and the like may be used solely to distinguish one entity or action from another entity or action without necessarily requiring or implying any actual such relationship or order between such entities or actions. Numerical ordinals such as "first," "second," etc. simply denote different singles of a plurality and do not imply any order or sequence unless specifically defined by the claim language. The sequence of the text in any of the claims does not imply that process steps must be performed in a temporal or logical order according to such sequence unless specifically defined by the claim language. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit for a switching converter providing an output voltage at an output terminal, the control circuit comprising:
   a switch control circuit configured to receive a feedback voltage signal indicative of the output voltage and to generate a switch control signal to control a switch of the switching converter based on the feedback voltage signal; and
   a dummy load control circuit coupled to the switch control circuit, wherein based on operation of the switch control circuit, the dummy load control circuit is configured to generate a dummy load control signal to regulate the power consumed by a dummy load coupled between the output terminal and a reference ground; wherein when a switching frequency of the switching converter is lower than a first frequency threshold, the power consumed by the dummy load is regulated to increase with a decrease of the switching frequency.

2. The control circuit of claim 1, wherein
the dummy load control circuit is configured to provide the dummy load control signal to a control terminal of a controllable semiconductor device used as the dummy load, and configured to generate a control current signal related to the operation of the switch control circuit to regulate the dummy load control signal.

3. The control circuit of claim 1, wherein:
when the switching frequency is higher than a second frequency threshold, the power consumed by the dummy load is regulated to be zero substantially.

4. The control circuit of claim 2, wherein the dummy load control circuit comprises:
a timing unit configured to receive the switch control signal to generate a timing signal, wherein the timing signal is in a first state when a timing length is lower than a first time threshold, and wherein the timing signal is in a second state when the timing length is higher than the first time threshold;
a capacitor coupled between the control terminal of the controllable semiconductor device and the reference ground, wherein the dummy load control signal is generated based on a voltage across the capacitor; and
a charging and discharging control unit configured to charge the capacitor in response to the first state of the timing signal and to discharge the capacitor in response to the second state of the timing signal.

5. The control circuit of claim 4, wherein the charging and discharging control unit comprises:
a discharging control switch configured to control a discharging current source to provide the control current signal with negative value to discharge the capacitor; and
a charging control switch configured to control a charging current source to provide the control current signal with positive value to charge the capacitor, wherein the control current signal with the negative value and the control current signal with positive value have the same absolute values.

6. A control circuit for a switching converter providing an output voltage at an output terminal, the control circuit comprising:
an error amplifying circuit configured to receive a feedback voltage signal indicative of the output voltage and to amplify a difference between the feedback voltage signal and a reference voltage signal to generate an error amplifying signal; and
a dummy load control circuit coupled to the error amplifying circuit, wherein based on the error amplifying signal, the dummy load control circuit is configured to generate a dummy load control signal to regulate the power consumed by a dummy load coupled between the output terminal and a reference ground; wherein
when the error amplifying signal is lower than a voltage threshold, the power consumed by the dummy load is regulated to increase with a decrease of the error amplifying signal.

7. The control circuit of claim 6, wherein:
the dummy load control circuit is configured to provide the dummy load control signal to a control terminal of a controllable semiconductor device used as the dummy load, and configured to generate a control current signal related to the error amplifying signal to regulate the dummy load control signal.

8. The control circuit of claim 7, wherein the dummy load control circuit comprises:
a voltage current converting unit configured to receive the error amplifying signal and to generate a converting current signal based on the error amplifying signal, wherein the converting current signal decreases with the decrease of the error amplifying signal;
a current clamping unit configured to receive the converting current signal and to generate the control current signal, wherein when the converting current signal is higher than a current threshold, the control current signal is a zero current signal, and wherein when the converting current signal is lower than the current threshold, the control current signal increases with the decrease of the converting current signal; and
a dummy load control signal generator configured to receive the control current signal and to generate the dummy load control signal based on the control current signal.

9. The control circuit of claim 8, wherein the voltage current converting unit comprises:
a transistor having a first terminal, a second terminal and a control terminal, wherein the control terminal is configured to receive the error amplifying signal, the first terminal is configured to provide a first current signal and the second terminal is coupled to the reference ground; and
a first current mirror having an input terminal and an output terminal, wherein the input terminal is configured to receive the first current signal and the output terminal is configured to provide the converting current signal.

10. The control circuit of claim 8, wherein the current clamping unit comprises:
a current source configured to provide a second current signal; and
a second current mirror having an input terminal and an output terminal, wherein the input terminal is configured to receive the second current signal and the converting current signal, and the output terminal is configured to provide the control current signal.

11. A switching converter comprising:
a switching circuit configured to provide an output voltage at an output terminal;
a switch control circuit configured to receive a feedback voltage signal indicative of the output voltage and to generate a switch control signal to control a switch of the switching circuit based on the feedback voltage signal; and
a dummy load control circuit coupled to the switch control circuit, wherein based on operation of the switch control circuit, the dummy load control circuit is configured to generate a dummy load control signal to regulate the power consumed by a dummy load coupled between the output terminal and a reference ground; wherein
when a switching frequency of the switching circuit is lower than a first frequency threshold, the power consumed by the dummy load is regulated to increase with a decrease of the switching frequency.

12. The switching converter of claim 11, wherein
the dummy load control circuit is configured to provide the dummy load control signal to a control terminal of a controllable semiconductor device used as the dummy load, and configured to generate a control current signal related to the operation of the switch control circuit to regulate the dummy load control signal.

13. The switching converter of claim 11, wherein:
when the switching frequency is higher than a second frequency threshold, the power consumed by the dummy load is regulated to be zero substantially.

14. The switching converter of claim 12, wherein the dummy load control circuit comprises:
a timing unit configured to receive the switch control signal to generate a timing signal, wherein the timing signal is in a first state when a timing length is lower than a first time threshold, and wherein the timing signal is in a second state when the timing length is higher than the first time threshold;
a capacitor coupled between the control terminal of the controllable semiconductor device and the reference ground, wherein the dummy load control signal is generated based on a voltage across the capacitor; and
a charging and discharging control unit configured to charge the capacitor in response to the first state of the timing signal and to discharge the capacitor in response to the second state of the timing signal.

15. The switching converter of claim 14, wherein the charging and discharging control unit comprises:
a discharging control switch configured to control a discharging current source to provide the control current signal with negative value to discharge the capacitor; and
a charging control switch configured to control a charging current source to provide the control current signal with positive value to charge the capacitor, wherein the control current signal with the negative value and the control current signal with positive value have the same absolute values.

* * * * *